(12) United States Patent
Child et al.

(10) Patent No.: US 6,341,352 B1
(45) Date of Patent: Jan. 22, 2002

(54) METHOD FOR CHANGING A SECURITY POLICY DURING PROCESSING OF A TRANSACTION REQUEST

(75) Inventors: Garry L. Child, Austin; Theodore Jack London Shrader; Davis Kent Soper, both of Cedar Park, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/173,041

(22) Filed: Oct. 15, 1998

(51) Int. Cl.[7] ................................................. H04L 9/32
(52) U.S. Cl. ............................ 713/201; 705/69; 705/76
(58) Field of Search ................................. 713/201, 166, 713/183, 202, 165, 200, 2; 709/229, 223, 224, 225, 226; 705/26, 72, 76, 67, 64, 75, 70

(56) References Cited

U.S. PATENT DOCUMENTS

| | | | |
|---|---|---|---|
| 5,586,260 A | * 12/1996 | Hu | 713/200 |
| 5,606,663 A | 2/1997 | Kadooka | |
| 5,694,595 A | 12/1997 | Jacobs et al. | |
| 5,864,676 A | * 1/1999 | Beer et al. | 713/200 |
| 5,918,228 A | * 6/1999 | Rich et al. | 713/200 |
| 6,044,471 A | * 3/2000 | Colvin | |
| 6,115,040 A | * 9/2000 | Bladow et al. | 345/325 |

OTHER PUBLICATIONS

Microsoft's Vision of Lan Management: Finally a Real Beginning for OS/2, Hall, 1990, p. 16.*
AppleShare Server 3.0 Taps into System 7.0, Green, 1992. p. 119–120.*

* cited by examiner

Primary Examiner—Gail Hayes
Assistant Examiner—Denise Jackson
(74) Attorney, Agent, or Firm—Jeffrey S. LaBaw; Joseph R. Burwell; David Judson

(57) ABSTRACT

A method for changing a user password is preferably operative as a Web server impersonates a Web client to obtain access to files stored in a distributed file system space of a distributed computing environment. The method begins in response to receipt of a Web transaction request from the Web client to determine whether the user's password has expired. If so, the method suspends processing of the Web transaction request and then enters a password change subprogram to enable the user to define a new password. Typically, the password change subprogram displays a password change dialog that interacts with the user. Upon definition of the new password by the user, the mechanism resumes processing of the original Web transaction request. Alternatively, the user may be prompted to terminate the original transaction request and select a new URL and/or document.

29 Claims, 3 Drawing Sheets

METHOD FOR CHANGING A SECURITY POLICY DURING PROCESSING OF A TRANSACTION REQUEST

BACKGROUND OF THE INVENTION

1. Technical Field

The present invention relates generally to managing security policies as protected files (e.g., Web documents) are accessed by a Web browser user from a secure distributed file system.

2. Description of the Related Art

The World Wide Web of the Internet is the most successful distributed application in the history of computing. In the Web environment, client machines effect transactions to Web servers using the Hypertext Transfer Protocol (HTTP), which is a known application protocol providing users access to files (e.g., text, graphics, images, sound, video, etc.) via a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection.

Use of an HTML-compatible browser (e.g., Netscape Navigator or Microsoft Internet Explorer) at a client machine involves specification of a link via the URL. In response, the client makes a request to the server identified in the link and receives in return a document formatted, for example, according to HTML.

Many business organizations and other entities now desire to integrate Web transaction processing into their distributed computing environment in which users access distributed resources and process applications. A known distributed computing environment, called DCE, has been implemented using "open" software conforming to standards implemented from time-to-time by The Open Group or "TOG" (f/k/a the Open Systems Foundation (OSF)). As DCE environments become more popular, many applications have been written and utilized to provide distributed services such as data sharing, printing services and database access. The Open Group DCE includes a distributed file system, called Distributed File Services (DFS), for use in these environments.

DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace. Multiple servers can export their file system to this namespace. All DFS users, in the meantime, share this namespace, making all DFS files readily available from any DFS client machine.

The functionality of existing standalone Web servers in the enterprise environment has been extended to take advantage of the scalability, file availability and security features of DFS (and other similar distributed file systems). As a by-product, users with off-the-shelf browsers are able to easily access the Web information stored in the DFS namespace with no additional software on the client machine. This functionality has been implemented in a Web server plug-in product. The product allows a Web browser user to access documents stored in the Distributed File System (DFS) space of the Distributed Computing Environment (DCE). This is accomplished by enabling the user to log onto the browser with a valid DCE identity and then setting up the Web server with the appropriate DCE credentials to allow the server to access the document on behalf of the Web user.

Because DCE credentials are used to facilitate a Web transaction into DFS, however, there is a possibility that the user's password may have expired when the user attempts to access a DFS document. Thus, for example, a user may have a valid DCE credential on a given day but then leave his or her machine (with the browser open) running overnight. When the user arrives the next day, however, his or her DCE password may no longer be valid for some reason. Thus, for example, the administrator may not want the Web browser user to access the protected documents in DFS. Nevertheless, DCE takes no explicit action when the user's password has expired. Thus, the user may still be able to access the documents, which may be unacceptable to some administrators or in certain environments.

This invention addresses the problem of managing password expiration (or other security policy changes) in a system wherein a user of Web browser accesses Web documents stored in a secure distributed file system space.

BRIEF SUMMARY OF THE INVENTION

An object of this invention is to enable a Web browser user to automatically change a password when an invalid password is detected and then to use the new password to access documents in a secure distributed file system space. The technique is preferably implemented in conjunction with a Web server application that accesses a document within the file system space on behalf of the Web browser user.

Another more general object of this invention is to change or enforce a given security policy as a server impersonates a client to obtain access to files stored in a distributed file system space of a distributed computed environment.

Yet another object of this invention is to selectively inhibit a Web browser user having an expired password from accessing documents in a protected distributed file system space.

A more general object of this invention is to change a security policy for an application using a security subprogram that is independent of the application.

Still another more general object of this invention is to monitor a security policy change for a given process during the operation of another process and to selectively direct a user to a mechanism that enables the user to respond to the policy change.

Another object of this invention is to enable an administrator to lock a user out of DCE/DFS functionality from a Web browser until the administrator has an opportunity to renew the account and reset the user's password.

These and other objects of this invention are provided in various methods, systems and computer program products. Thus, for example, a method for changing a user password according to the present invention is preferably operative as a Web server impersonates a Web client to obtain access to files stored in a distributed file system space of a distributed computing environment. The distributed computing environment typically includes a security service for returning a credential to a user authenticated to access the distributed file system. The present invention provides a mechanism for enabling a user to change his or her password, for example, when the user's password has expired. The method begins in response to receipt of a Web transaction request from the Web client. At this point, a determination is made regarding whether the user's password has expired. If so, the mechanism preferably suspends processing of the Web transaction request and then enters a password change subprogram to enable the user to define a new password. Typically, the password change subprogram displays a password change dialog that interacts with the user. Upon definition of the new password by the user, the mechanism resumes processing of the original Web transaction request. Alternatively, the user may be prompted to terminate the original transaction request and select a new URL and/or document.

The mechanism preferably suspends processing of the Web transaction request by saving the user-requested Uniform Resource Locator (URL) in the Web transaction request and then redirecting the user to a URL associated with the password change subprogram. Upon completion of any necessary user interactions with the password change subprogram, the original transaction is resumed, preferably by restoring the user-requested URL back into the Web transaction request. This operation may take place automatically upon definition of the new password. Alternatively, the user may be required to take some given action, e.g., selection of a CONTINUE button or the like, to complete the original transaction.

Although the inventive method is preferably used to change a user's password during a particular type of Web transaction, namely, as a Web server impersonates the Web client to obtain access to files stored in a distributed file system of a distributed computing environment, the inventive technique has more general applicability. Thus, a more general object of this invention is to provide a method for enforcing or changing a security policy for an application that begins by intercepting a user credential from a client sent to the application. Thereafter, a determination is made regarding whether a revised security policy for the application exists. If so, the method calls or otherwise enters a security subprogram that interacts with the user. Upon satisfactory conclusion of any necessary security interaction, the application is invoked. Because the security subprogram preferably is independent of the application, the revised security policy is imposed without any change in the application. In one preferred embodiment as described above, the intercepting step is performed by a server, such as a middle-tier Web server, and the security subprogram is at a different URL than the application.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
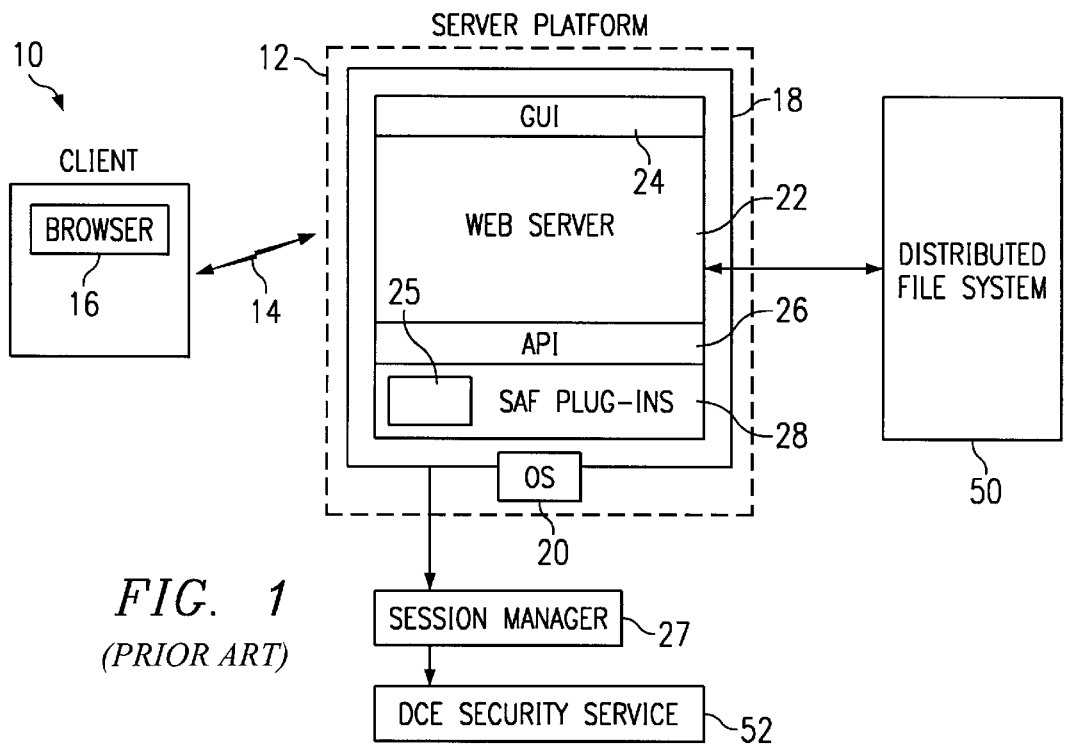
FIG. 1 is a representative system in which a server application function (SAF) plug-in and a session manager are implemented (illustrated as Prior Art)
Figure 2:
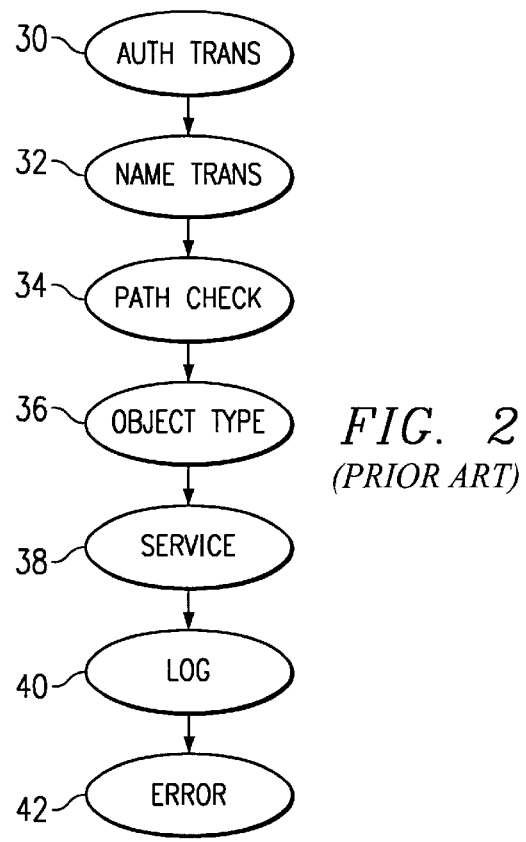
FIG. 2 is a flowchart of server side operations of a conventional Web transaction in response to receipt of a request from a browser of a client machine (illustrated as Prior Art)
Figures 3, 5:
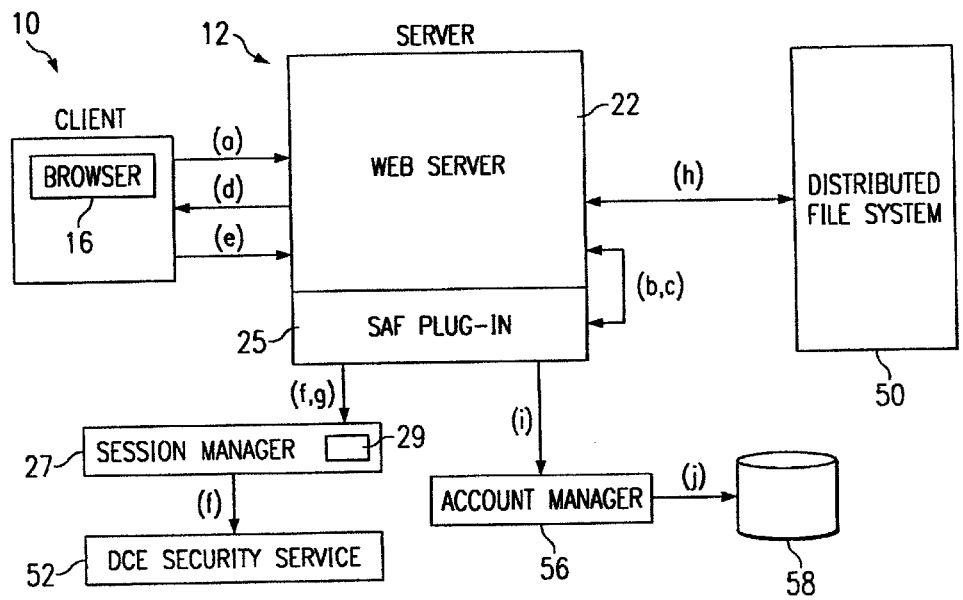
FIG. 3 is a process flow diagram illustrating a known technique for implementing a Web transaction into the Distributed File System (DFS) space (illustrated as Prior Art)
FIG. 5 is a diagram illustrating a change password dialog screen as used in the present invention.

FIGS. 1–3 are provided herein by way of background. Thus, a representative system in which the present invention is implemented is illustrated in FIG. 1. A client machine 10 is connected to a Web server platform 12 via a communication channel 14. For illustrative purposes, channel 14 is the Internet, an intranet or other known connection. In the case of the Internet, Web server platform 12 is one of a plurality of servers that are accessible by clients, one of which is illustrated by machine 10. A client machine includes a browser 16, which is a known software tool used to access the servers of the network. A client machine preferably is a personal computer. Representative browsers include, among others, Netscape Navigator (all versions), Microsoft Internet Explorer (all versions) or the like, each of which are "off-the-shelf" or downloadable software programs.

A representative Web Server platform 12 comprises an Intel processor-based computer 18 running a multi-user operating system 20 (such as AIX® or Solaris) and a Web server program 22, such as Netscape Enterprise Version 2.x (or higher), that supports interface extensions. The platform 12 also includes a graphical user interface (GUI) 24 for management and administration. The Web server 18 also includes an Application Programming Interface (API) 26 that provides extensions to enable application developers to extend and/or customize the core functionality thereof through software programs commonly referred to as "plug-ins."

The Web server accepts a client request and returns a response. The operation of the server 18 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client via a normal server-service routine. The particular function selected depends on the nature of the request. At step 40, called Add Log (AddLog), information about the transaction is recorded. At step 42, called Error, the server responds to the client when it encounters an error.

It is known in the art to enable the user of the client machine 10 to use the browser 16 to access, browse and retrieve documents located in the distributed file system space 50. Thus, for example, in the IBM Web Secure product, the plug-in SAF 25 and session manager process 27 provide a mechanism to achieve this object. One such file system space 50 is Distributed File Services (DFS), which is a known distributed file system implemented in a networked environment commonly referred to as the Distributed Computing Environment (DCE). DCE has been implemented using software available from the Open Group, which was formerly known as Open Systems Foundation (OSF). In a distributed computing environment, a group of machines is typically referred to as a "domain." An TOG DCE domain is called a "cell." A DCE cell may be a complex environment involving hundreds of machines in many locations.

DCE DFS 50 provides data sharing services by making use of remote procedure calls (RPC's) for naming, and a DCE Security Service 52 for authentication services. DFS 50 and the session manager process 27 interface with the DCE Security Service 52.

DFS 50 uses DCE Kerberos-based authentication. A UNIX "credential" is associated with each file operation and holds the local authentication information for that operation. A credential is a data structure defining a particular machine (or a user on a multi-user machine). From the local operating system's point-of-view, the credential includes a user id, a group id, optionally a list of operating system privileges, and an authentication identifier known as a PAG (Process Authentication Group). The PAG acts as a tag for associating "tickets" between DFS 50 and the DCE Security Server 52. When DFS users authenticate via the DCE Login facility, known as $dce_{13}$ login, the DCE Security Service interacts with DFS (across the network) through a setpag( ) interface to establish the PAG/ticket relationship in the process's credential. On filesystem requests, DFS extracts the PAG from the credential structure to establish the DCE user's authentication for RPC requests to the DFS fileserver.

The known control flow associated with the IBM Web Secure product is illustrated in the process flow diagram of FIG. 3. This figure illustrates the basic system of FIG. 1, with the inclusion of an account manager 56 having an associated database 58. Session manager 27 starts up upon initialization of the Web server and is preferably run by the workstation computer. It includes its own storage area 29. When the client 10 (through the browser 16) requests a DFS document (step a), the Web server 18 invokes a server path check (using the SAF plug-in 25)(step b). The PathCheck function checks with the session manager 27 to determine whether the user has appropriate DCE credentials. If not (step c), the SAF plug-in 25 will return an error message (e.g., "401; Unauthorized") to the browser 16 (step d), which will cause the browser to prompt the user for user id and password. After getting the user id and password from the user (step e), the session manager 27 is invoked (step f) to obtain the DCE credential for the user. Session manager 27 returns the DCE credential to the Web server (step g). The server then uses this user credential to represent the user to retrieve documents stored in DFS 50 (step h). After retrieving the documents, the account manager 56 is invoked (step i) (preferably using another API plug-in) to save appropriate usage information into the database 58 (step j).

The session manager 27 thus is invoked by the web server when a user attempts to access a DFS file. If a user has already been authenticated by DCE, the session manager 27 returns the user credential to the server, which uses this credential to retrieve DFS documents on behalf of the user. If not, the session manager 27 will login for the user and obtain the credential from DCE security. The session manager maintains the in-memory database 29 to keep track of which user has logged in so that a user may access multiple DFS pages.

The present invention provides an improvement to the above-described mechanism. In particular, whenever the user's password has expired, it is desirable according to the present invention to suspend a given Web transaction request and then direct the user to a change password dialog so that a new, unexpired password may be used to complete the transaction. Thus, for example, when the Web browser user's DCE password has expired, the administrator may no longer want the user to access protected documents stored in DFS and/or to use the DCE/DFS Administration function to manage DCE. Instead, the administrator may desire the user to change or renew his or her password or perhaps to use a different user identification.

DCE/DFS provides an administration utility that facilitates a change password function through its interface. The present invention thus provides a mechanism to detect that the user's password has expired and then to automatically switch the user into the DCE/DFS administration change password or other equivalent function. Once the user has changed his or her password, the original request is allowed to continue.

Figure 4:
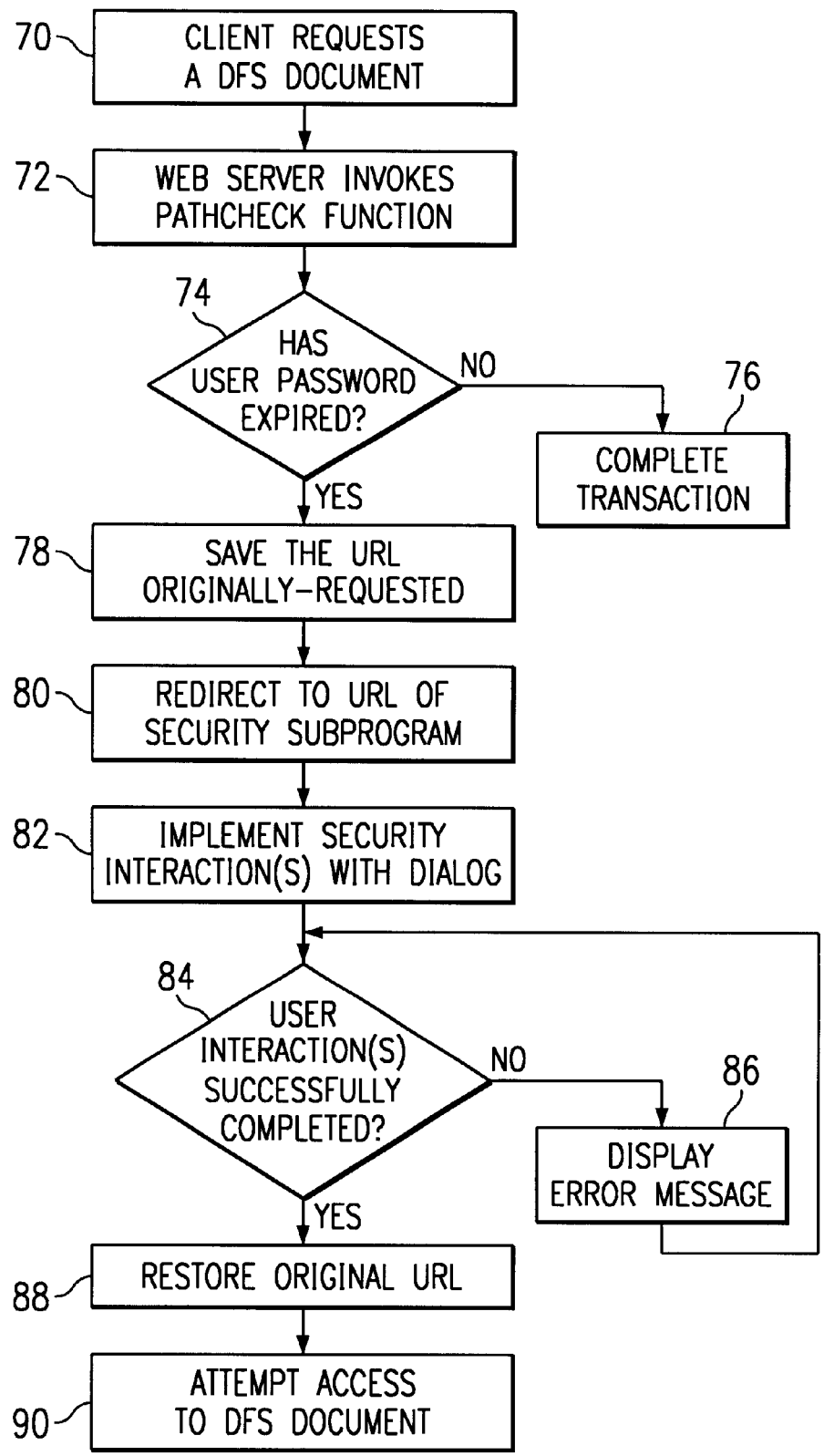
FIG. 4 is a flowchart describing the preferred routine of the present invention.

Referring now to FIG. 4, a flowchart illustrating the preferred operation of the inventive change password routine is now described. Preferably, this routine is implemented in software, namely, as part of the process described above with respect to FIG. 3. The routine begins at step 70 when the client 10 (through the browser 16) requests a DFS document. As described above, the Web server then invokes a server path check at step 72. The PathCheck function checks with the session manager to determine whether the user has appropriate DCE credentials. If so, the routine continues at step 74 to determine whether the user's password has expired. This step is also preferably performed during the PathCheck function. If the outcome of the test at step 74 is negative, the routine branches to step 76 and completes the transaction processing as has been previously described. On the other hand, if the outcome of the test at step 74 indicates that the user's password has expired, the routine continues at step 78 to save the user-requested URL from the original request. At step 80, the routine redirects the user to a security subprogram that is used to modify, alter or otherwise change the password (or more generally, a security policy). Thus, in this illustrative embodiment, step 80 substitutes a new URL, for example:
<server>:<port>/dceweb/cgi-bin/wgrcgi??Action= ChangePassword, which brings up the DCE/DFS administration change password dialog function. This dialog is illustrated in FIG. 5, by way of example.

The routine then continues at step 82 during which any necessary user interactions with the dialog take place. At step 84, a test is performed to determine whether the user interactions have been successfully completed. If the outcome of the test at step 84 is negative, the routine branches to step 86 and displays a modified panel with an error message. Thereafter, the routine returns to step 84. If, however, the outcome of the test at step 84 is positive, the routine continues at step 88 to restore the originally-requested URL (which was saved previously). At step 90, an attempt to access the requested document is then made (with the new DCE credentials). This completes the processing.

In the preferred embodiment of the invention, the change password dialog screen as illustrated in FIG. 5 includes an additional control button 75 (marked CONTINUE) on the panel. Once the user has changed his or her password in the password change field 77, the "CONTINUE" button allows the user to continue processing the original request. Selection of this button restores the originally-requested URL. The panel may also include a button 79 to enable the user (following change of his or her password) to return to a condition existing before selection of the DCE-protected URL. As also noted above, if the user makes a mistake when changing his or her password, the DCE/DFS administration function preferably redisplays the panel with an error message.

It is not required that the user select the CONTINUE button. Alternatively, and in the preferred embodiment, if the user changed the password correctly, the mechanism automatically detects the successful execution and simply redirects the user to the original URL. This saves the user from having to press the CONTINUE button representing the original URL.

The illustrative embodiment of the invention has been described in the context of a changed (i.e. expired) password. One of ordinary skill in the art, however, will appreciate that the present invention is not limited to administration of expired passwords. More generally, the inventive technique is applicable whenever a so-called "security policy" change is implemented. In particular, it is known in the art to implement a security policy that includes one or more rules for a given password or other identifier. Thus, for example, a given security policy may include rules governing the length of the password, the type of characters that may be used in the password, a specification of character positions (e.g., position x must include character y), the duration of a given password, and the like. Thus, the inventive technique of directing the user to a security subprogram (e.g., the change password dialog) is also conveniently implemented more generally with respect to any given security policy (and not just merely an expired DCE password).

Thus, according to a more general aspect of the present invention, the routine may be used to change a given security policy as a server impersonates a client to obtain access to files stored in the distributed file system space of the distributed computing environment. This routine thus begins in response to receipt of a transaction request from the client by determining whether a revised security policy exists. This revised policy may be created by the administrator. If a revised security policy exists, the routine preferably suspends processing of the transaction request and then displays a change security policy dialog to the user. This dialog enables the user to conform to the revised security policy (e.g., by changing his or her password, etc.). When the user has completed his or her security interactions with the dialog, processing of the original Web transaction request may then be resumed or the user may select to go to another URL.

This technique of changing or revising security policies may also be used by a system administrator for controlling access to the DCE/DFS environment. Thus, for example, the present invention is useful to enable a DCE cell administrator to lock a Web browser user out of DCE/DFS functionality until the cell administrator has an opportunity to renew the user's account and/or reset the user's password.

As used herein, "Web" client should be broadly construed to mean any computer or component thereof directly or indirectly connected or connectable in any known or later-developed manner to a computer network, such as the Internet. The term "Web" server should also be broadly construed to mean a computer, computer platform, an adjunct to a computer or platform, or any component thereof.

One of the preferred implementations of the server plug-in component and the associated processes of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Thus, for example, while the present invention is preferably implemented to allow off-the-shelf browsers to access Web documents stored in DFS, the principles of the invention are equally applicable with other known architectures such as AFS (from which DFS was derived), as well as the Network File System (NFS) developed by Sun Microsystems. Moreover, implementation in Open Group DCE is not a requirement of the present invention either.

Having thus described our invention, what we claim as new and desire to secure by letters patent is set forth in the following claims.

What is claimed is:

1. A method for changing a security policy for an application, the method comprising the steps of:
   intercepting a user credential from a client sent to the application;
   determining that a revised security policy for the application exists, wherein the revised security policy represents a security policy that was revised after the user credential was issued;
   entering a security subprogram that interacts with a user, the security subprogram being independent of the application; and
   upon satisfactory conclusion of the security interaction, invoking the application.

2. The method as described in claim 1 wherein the revised security policy is imposed without any change in the application.

3. The method as described in claim 1 wherein the application has no security policy.

4. The method as described in claim 1 wherein the intercepting step is performed by a server.

5. The method as described in claim 4 wherein the server is a Web server and the security subprogram is at a different URL than the application.

6. The method as described in claim 5 wherein the method further includes the steps of:
   redirecting the user credential to the security subprogram URL when directed by the security policy; and handling any needed interactions with the application by the security subprogram.

7. A method for changing a user password as a Web server accesses files stored in a distributed file system of a distributed computing environment, the method comprising the steps of:

responsive to receipt of a Web transaction request from a Web client, determining whether a credential for accessing files stored in the distributed file system has been associated with a user of the Web client during processing of a previous Web transaction request;

in response to a determination that a credential has been previously associated with the user, determining whether the user's password has expired;

if the user's password has expired, suspending processing of the Web transaction request and entering a password change subprogram to enable the user to define a new password; and upon definition of the new password, resuming the processing of the Web transaction request.

8. The method as described in claim 7 wherein the step of suspending processing of the Web transaction request includes;

saving a user-requested Uniform Resource Locator (URL) in the Web transaction request; and redirecting the user to a URL associated with the password change subprogram.

9. The method as described in claim 8 wherein the step of resuming the processing of the Web transaction request includes the step of restoring the user-requested URL back into the Web transaction request.

10. The method as described in claim 7 wherein the step of resuming the processing of the Web transaction request occurs automatically upon definition of the new password.

11. The method as described in claim 7 wherein the step of resuming the processing of the Web transaction requests occurs upon definition of the new password and completion of a given user action.

12. The method as described in claim 11 wherein the given user action is selection of a display button.

13. The method as described in claim 7 wherein the password change subprogram displays a change password dialog to the user.

14. The method as described in claim 7 wherein the distributed computing environment includes a security service for returning a credential to a user authenticated to access the distributed file system.

15. A method for changing a security policy as a server accesses files stored in a distributed file system of a distributed computing environment, the method comprising the steps of:

responsive to receipt of a transaction request from a client, determining whether a credential for accessing files stored in the distributed file system has been associated with a user of the client during processing of a previous transaction request;

in response to a determination that a credential has been previously associated with the user, determining whether a revised security policy exists;

if the revised security policy exists, suspending processing of the transaction request;

displaying a change security policy dialog to the user to enable the user to conform to the revised security policy; and upon satisfactory conformance to the revised security policy, resuming the processing of the Web transaction request.

16. The method as described in claim 15 wherein the step of suspending processing of the transaction request includes;

saving a user-requested Uniform Resource Locator (URL) in the transaction request; and redirecting the user to a URL associated with a change security policy subprogram.

17. The method as described in claim 16 wherein the step of resuming the processing of the transaction request includes the step of restoring the user-requested URL back into the transaction request.

18. The method as described in claim 15 wherein the step of resuming the processing of the transaction request occurs automatically upon satisfactory conformance to the revised security policy.

19. The method as described in claim 15 wherein the server is a Web server, the client is a Web client having a browser, and the transaction request is a Web transaction.

20. A computer program product in a computer-readable medium method for use in changing a user password as a Web server accesses files stored in a distributed file system of a distributed computing environment, the computer program product comprising:

means responsive to receipt of a Web transaction request from a Web client for determining whether a credential for accessing files stored in the distributed file system has been associated with a user of the Web client during processing of a previous Web transaction request;

means responsive to a determination that a credential has been previously associated with the user for determining whether the user's password has expired;

means for suspending processing of the Web transaction request if the user's password has expired;

means for transferring control to a password change subprogram to enable the user to define a new password; and means responsive to definition of the new password for resuming the processing of the Web transaction request.

21. The computer program product as described in claim 20 wherein the means for suspending processing of the Web transaction request includes means for saving a user-requested Uniform Resource Locator (URL) in the Web transaction request.

22. The computer program product as described in claim 20 wherein the means for transferring control includes means for redirecting the user to a URL associated with the password change subprogram.

23. The computer program product as described in claim 22 wherein the means for resuming the processing of the Web transaction request includes means for restoring the user-requested URL back into the Web transaction request.

24. In a computer network in which a client is connectable to a server to enable access to documents within a secure database, the improvement comprising:

means responsive to receipt of a transaction request from the client for determining whether a credential for accessing the documents within the secure database has been associated with a user of the client during processing of a previous transaction request;

means responsive to a determination that a credential has been previously associated with the user for determining whether the user's password has expired;

means for suspending processing of the transaction request if the user's password has expired;

means for transferring control to a password change subprogram to enable the user to define a new password; and means responsive to definition of the new password for resuming the processing of the transaction request.

25. In the computer network as described in claim 24 wherein the means for suspending processing of the transaction request includes means for saving a user-requested Uniform Resource Locator (URL) in the transaction request.

26. In the computer network described in claim 24 wherein the means for transferring control includes means for redirecting the user to a URL associated with the password change subprogram.

27. In the computer network as described in claim 26 wherein the means for resuming the processing of the Web transaction request includes means for restoring the user-requested URL back into the transaction request.

28. In the computer network as described in claim 24 wherein the client includes a Web browser.

29. A computer connectable to a secure database, comprising:

a processor;

an operating system;

a Web server program for processing client requests; and means for changing a security policy, comprising:

means responsive to receipt of a transaction request from a client for determining whether a credential for accessing information in the secure database has been associated with a user of the client during processing of a previous transaction request;

means responsive to a determination that a credential has been previously associated with the user for determining whether the user's password has expired;

means for suspending processing of the transaction request if the user's password has expired;

means for transferring control to a password change subprogram to enable the user to define a new password; and means responsive to definition of the new password for resuming the processing of the transaction request.

* * * * *